Nov. 18, 1924.

R. W. McLEAN 1,516,052

METHOD OF AND MACHINE FOR FILING GIN SAWS

Filed July 30 1921     11 Sheets-Sheet 2

Fig. 2.

Inventor
Robert W. McLean by his Attorneys

Nov. 18, 1924. 1,516,052
R. W. McLEAN
METHOD OF AND MACHINE FOR FILING GIN SAWS
Filed July 30 1921 11 Sheets-Sheet 5

Nov. 18, 1924.  
R. W. McLEAN  
1,516,052  
METHOD OF AND MACHINE FOR FILING GIN SAWS  
Filed July 30, 1921  11 Sheets-Sheet 6

Fig. 6.

Inventor  
Robert W. McLean  
by Roberts, Roberts & Cushman  
Attorneys

Nov. 18, 1924.
R. W. McLEAN
1,516,052
METHOD OF AND MACHINE FOR FILING GIN SAWS
Filed July 30, 1921  11 Sheets-Sheet 7
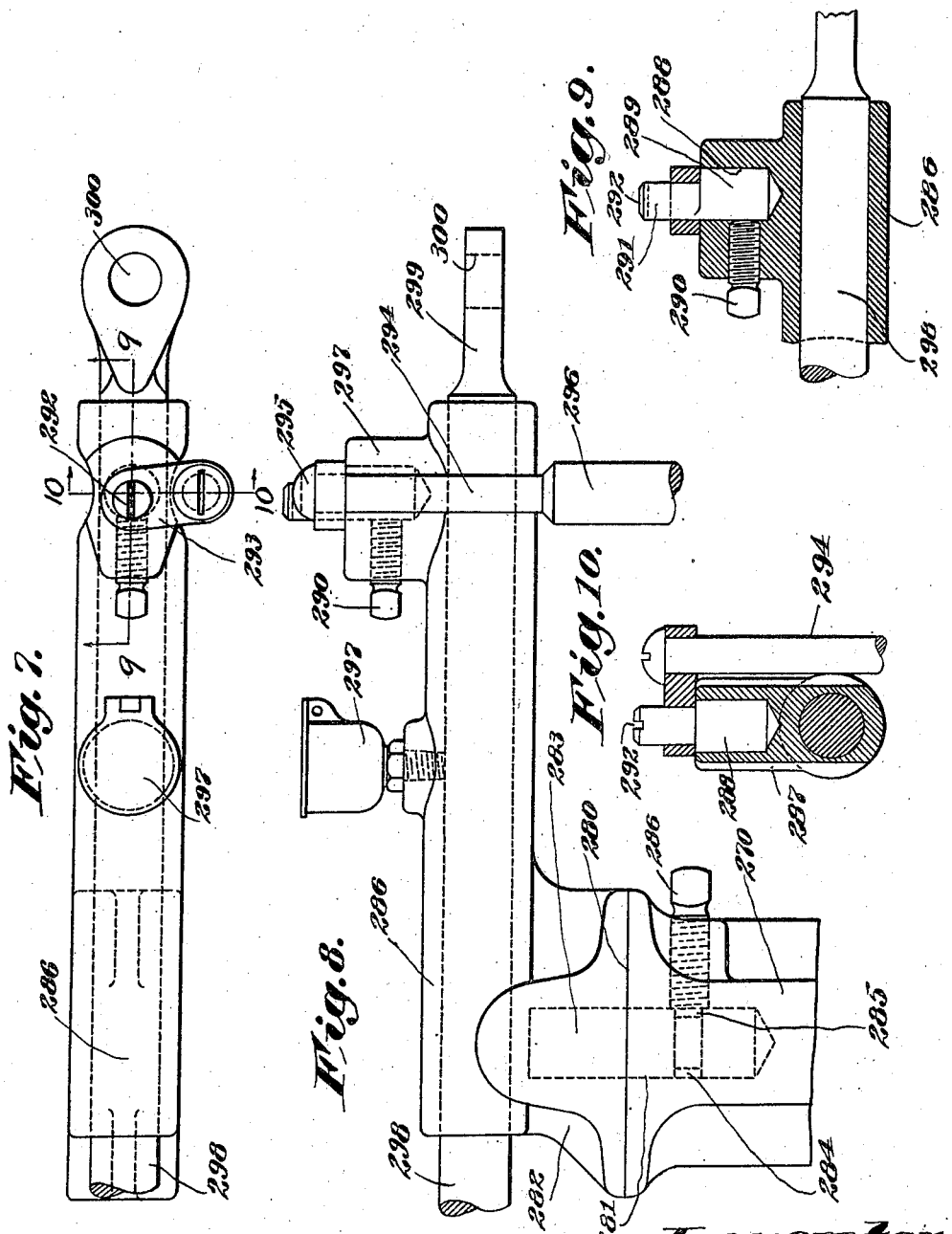

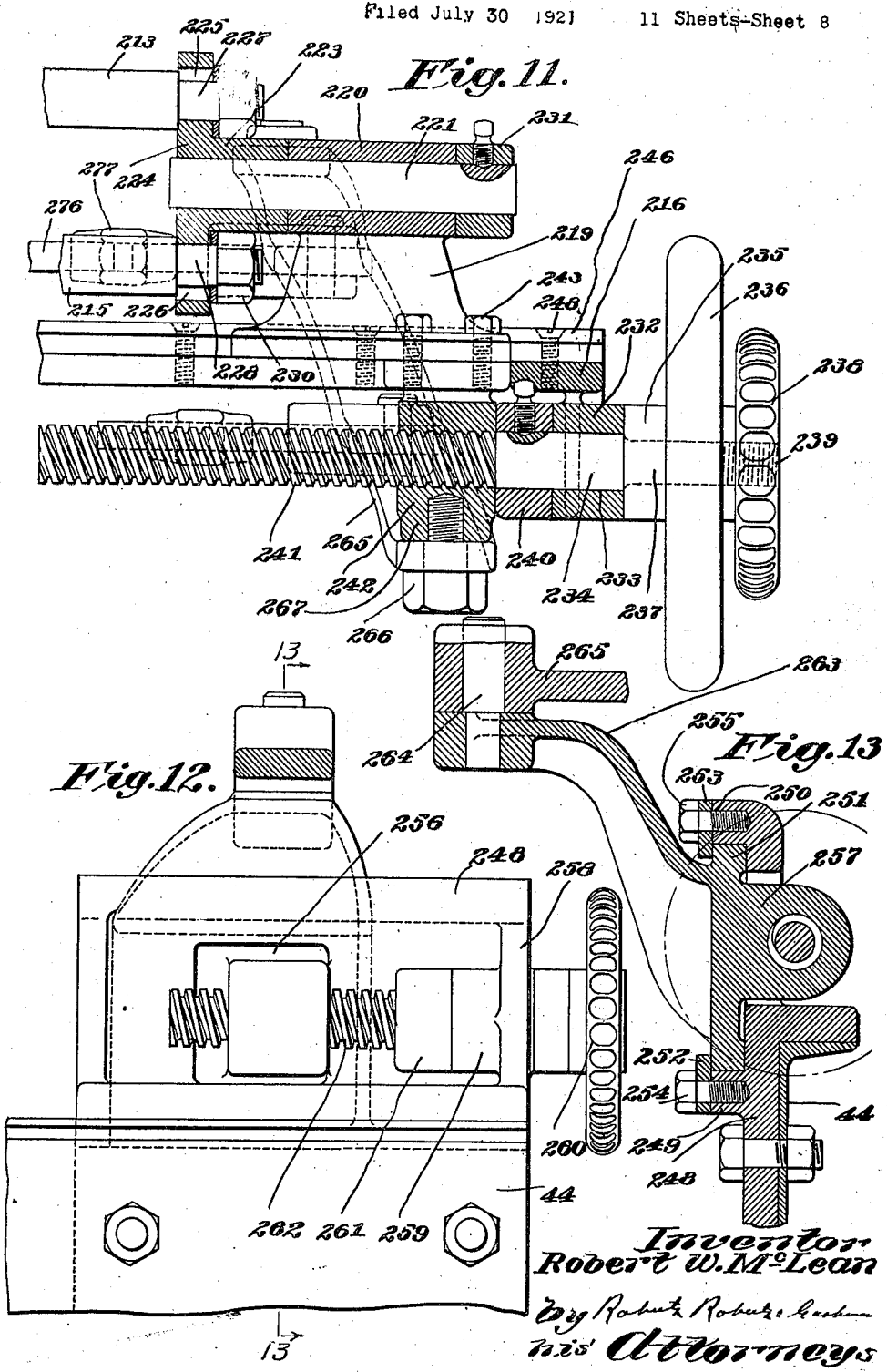

Nov. 18, 1924.
R. W. McLEAN
1,516,052
METHOD OF AND MACHINE FOR FILING GIN SAWS
Filed July 30, 1921    11 Sheets-Sheet 9
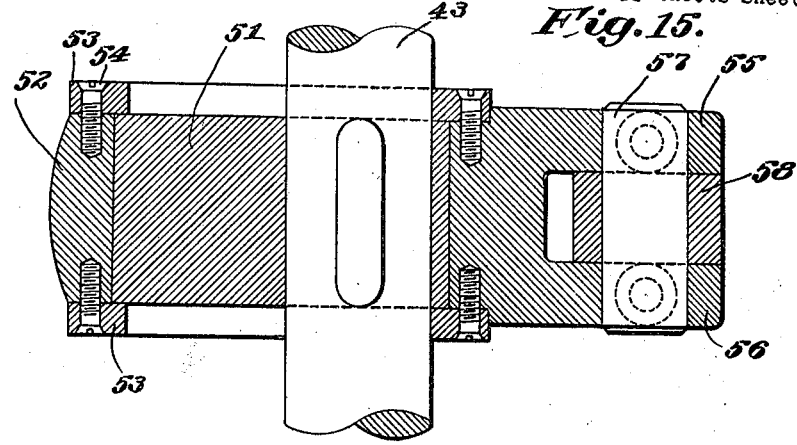
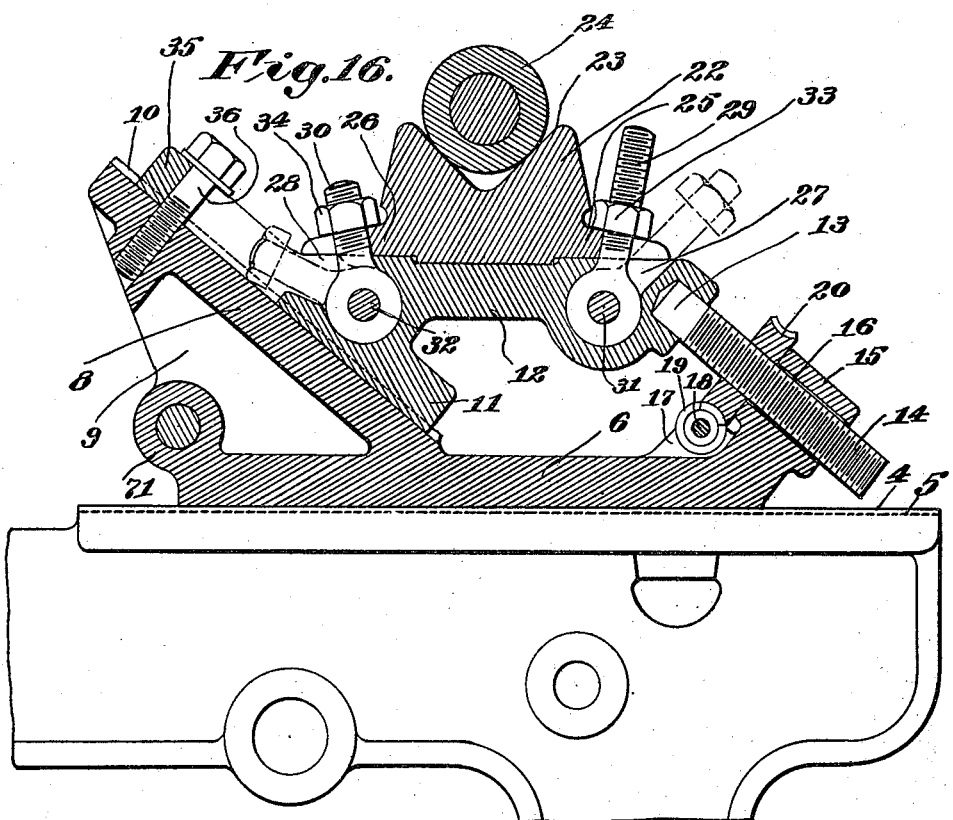
Inventor
Robert W. McLean
by Roberts, Roberts & Cushman
his Attorneys Nov. 18, 1924.  1,516,052
R. W. McLEAN
METHOD OF AND MACHINE FOR FILING GIN SAWS
Filed July 30, 1921  11 Sheets-Sheet 10
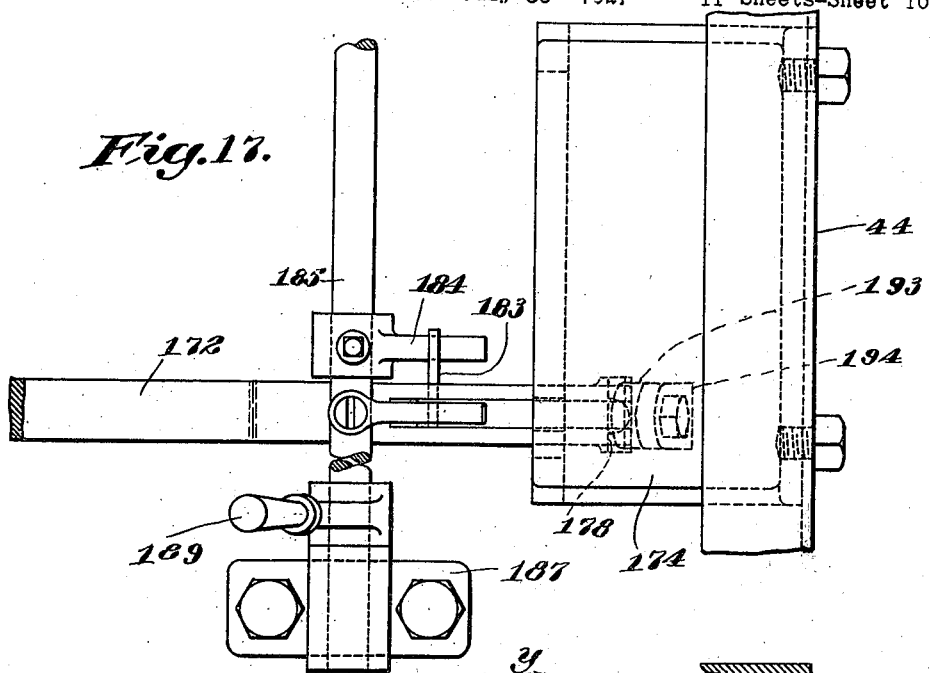
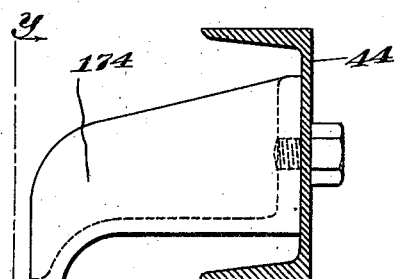
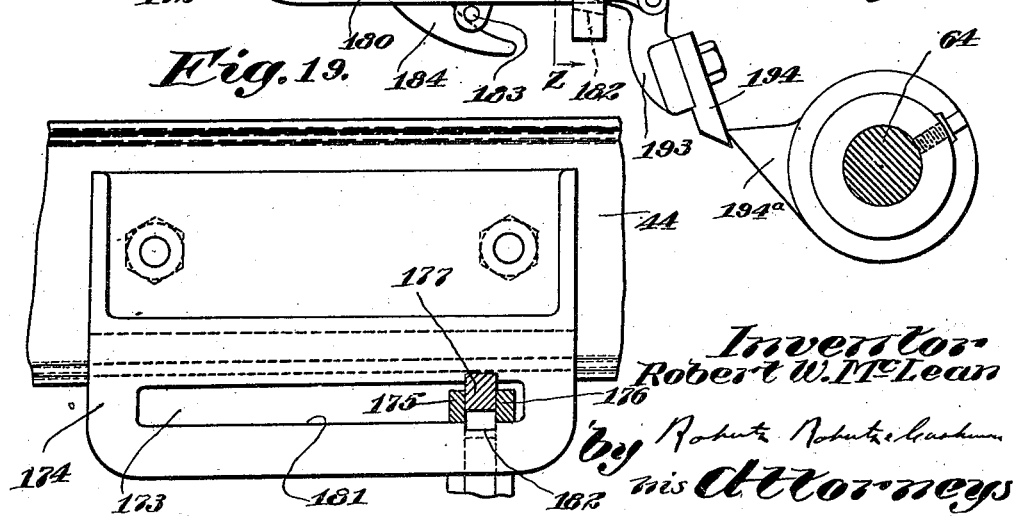
Inventor
Robert W. McLean
by his Attorneys

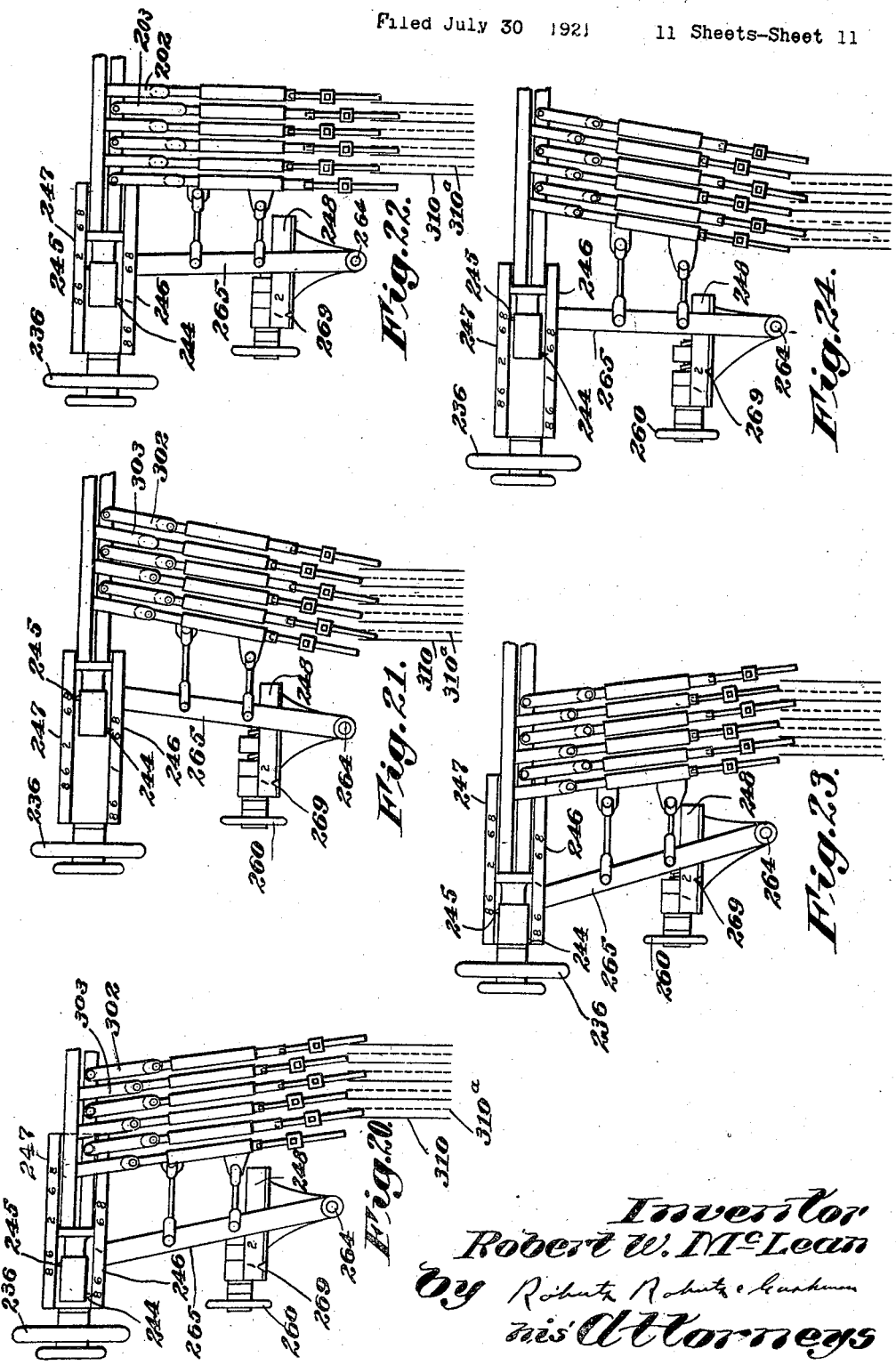

Patented Nov. 18, 1924.

1,516,052

UNITED STATES PATENT OFFICE.

ROBERT W. McLEAN, OF BRIDGEWATER, MASSACHUSETTS, ASSIGNOR TO CARVER COTTON GIN COMPANY, OF EAST BRIDGEWATER, MASSACHUSETTS, A CORPORATION OF MASSACHUSETTS.

METHOD OF AND MACHINE FOR FILING GIN SAWS.

Application filed July 30, 1921. Serial No. 488,586.

*To all whom it may concern:*

Be it known that I, ROBERT W. McLEAN, a citizen of the United States of America, and resident of Bridgewater, in the county of Plymouth and State of Massachusetts, have invented new and useful Improvements in Methods of and Machines for Filing Gin Saws, of which the following is a specification.

This invention concerns machines for filing saws and relates more particularly to mechanism especially useful in the filing of gin or linter saws.

In cotton gins and linters, the fibre is separated from the seeds by the use of circular saws, a large number of which are arranged in closely spaced relation upon a single shaft or arbor. The teeth of these saws must be kept sharp for efficient operation, and as it is inexpedient to remove them from their supporting shaft after once securing them in position thereon, it is necessary to sharpen them without separating them one from the other.

As the shaft may support a large number of saws and as each saw has many teeth, the sharpening of such teeth in an expeditious manner presents a problem of considerable difficulty. While the operation may be, and in many cases, is performed by hand, the time consumed is so great as to necessitate the keeping on hand of a large stock of extra saws in order to permit of continuous operation of the gin or linter. Various machines have heretofore been devised for use in the filing of gin saws, but in many cases, such machines, if practical at all, are but little faster than a skilled workman filing the saws by hand, and in most cases require the constant or frequent attention of an attendant.

The principal object of the present invention is to provide mechanical means for filing gin or linter saws in a highly expeditious manner and with a minimum degree of attention from an operator or attendant. To this end it is proposed to mount the saw shaft or arbor in suitable supports and to turn the shaft slowly whereby to bring each saw tooth into the plane of operation of the filing devices. The filing devices may be so arranged as simultaneously to engage corresponding teeth of a plurality of the saws, preferably alternate saws of the entire series. Provision may also be made for stopping the machine automatically upon the completion of each rotation of the saw shaft, thus making it unnecessary for the attendant to watch the machine continuously.

As the saws are very closely adjacent to one another upon their shaft, it is inadvisable from a practical standpoint to provide for filing every saw simultaneously, due to the difficulty of holding and actuating files in such close proximity one to the other as would be necessary for such operation. In view of this difficulty, it is proposed, as above pointed out, to file alternate saws simultaneously. In accordance with a preferred mode of operation, after one complete revolution of the shaft, the files may be shifted relatively to the saws whereby to file the teeth of the intermediate saws. A further object of the present invention is to provide for the simultaneous shifting of each file of the series from one saw to the next adjacent saw. In carrying this object into effect it is preferred to so mount each file as to permit it to be swung about an axial point substantially in a radial plane bisecting the space between adjacent saws, the several files of the series being connected for simultaneous movement. Thus each file may be engaged alternatively with adjacent saws, making equal but opposite angles with the planes of their respective blades.

It is of course necessary to file the teeth of each saw at opposite angles, and a further object of the invention is to provide for a bodily shifting of the files relatively to the saws whereby, after all the saws of the series have been filed on one angle, they may then be filed on the opposite angle. Thus each file must be shifted from the space between a pair of saws which it has previously occupied to the next adjacent space. This necessitates the relative retraction of the files and saws to permit the files to pass laterally by the edges of the saws. For this purpose the saw shaft may be mounted for bodily movement toward and from the bank of file holders, and suitable means may be provided for moving the shaft with its saws away from the files when desired. The supporting means for the series of file holders may also be arranged for movement relatively to the machine frame whereby simultaneously to move the file holders bodily and longitudinally of the saw shaft to bring them into their new operative position. Suitable handle devices for adjusting, and retaining said supporting means in adjusted position, may be provided and if desired such handle devices may have index means associated therewith whereby to indicate which of their operative positions the file holders occupy. When in their new position the files may then be shifted whereby again successively to file alternate saws of the series.

In accordance with varying conditions of use, the tooth angles of the saws may vary, and it is evident that means must be provided whereby the operative position of the files relative to the planes of the corresponding saws may be changed. A further object of the invention is to provide for the variation of the angle of filing in accordance with the requirements of each particular case. With this object in view the several file holding and actuating elements of the series may be so arranged as to permit them to be adjusted to different angles relative to the planes of the corresponding saws, and to facilitate the proper setting of such file holding elements they may all be connected for simultaneous adjustment by means of a suitable handle with which graduated index means may be associated. As it may at times be desirable to adjust the angle of operation of individual files, means may also be provided permitting each saw holder to be adjusted independently of the other holders. Such adjusting means preferably comprises an eccentric pivot having connection with the saw holder and whereby the normal position of the latter may be varied.

When the diameters of the saws are reduced by wear and sharpening, it is necessary to change the position of the saw shaft in order to bring the saws into proper relation to the files. A further object is to furnish means whereby the position of the shaft may be adjusted in an accurate and expeditious manner. As one mode of attaining this object the shaft may be arranged to rest in cradles at the opposite ends of the machine, such cradles in turn being seated upon individual guides and being adjustable thereon by screw jacks. Such jacks may be connected for simultaneous adjustment whereby the cradles may be moved equally and in the same direction by the manipulation of a single handle or equivalent device.

In the simultaneous operation of a large number of reciprocating files arranged as above suggested, it is found that objectionable vibrations are set up which interfere with the accurate sharpening of the saws and also tend materially to increase wear of the moving parts and to impose an undesirable strain upon the same. In accordance with the present invention it is proposed to overcome this difficulty, in large measure, by arranging alternate files to reciprocate in opposite directions whereby the stresses due to the movement of the reciprocating parts are largely counterbalanced.

In the accompanying drawings is shown an arrangement of parts exemplifying means suitable for carrying the above objects into effect, and in which drawings:—

Fig. 2 is a plan view, partly broken away, of the machine as shown in Fig. 1;

Fig. 6 is a transverse cross section on a line such as 6—6 of Fig. 1;

Fig. 7 is a fragmentary plan view to larger scale illustrating one of the guide sleeves for the file holder together with associated parts;

Fig. 8 is a side elevation of the parts illustrated in Fig. 7;

Fig. 9 is a fragmentary cross section on the line 9—9 of Fig. 7;

Fig. 10 is a cross section at right angles to the section of Fig. 9 and substantially on line 10—10 of Fig. 7;

Fig. 11 is a fragmentary vertical cross section to enlarged scale, looking from the rear of the machine and illustrating an adjusting mechanism employed in changing the angular relation of the files to the saw blades;

Fig. 12 is a fragmentary rear elevation, partly in section, to enlarged scale, illustrating an adjusting mechanism employed in shifting the file from engagement with one saw into position for engagement with another saw;

Fig. 13 is a vertical cross section on a line such as 13—13 of Fig. 12;

Fig. 14 is a fragmentary elevation, partly in section, illustrating the upper end of a shaft comprised in the train of connections whereby the saw supporting shaft is driven;

Fig. 15 is a horizontal diametral section through an eccentric device employed in driving the file holders;

Fig. 16 is a vertical cross section illustrating a supporting cradle for the saw shaft;

Fig. 17 is a fragmentary plan view to large scale showing parts of a stop mechanism, with an actuating handle therefor;

Fig. 18 is a vertical section illustrating the parts shown in Fig. 17;

Fig. 19 is a detail rear elevation of certain of the parts shown in Fig. 18; and Figs. 20 to 24 inclusive are diagrammatic views illustrating the mode of operation of the machine.

Figure 1:
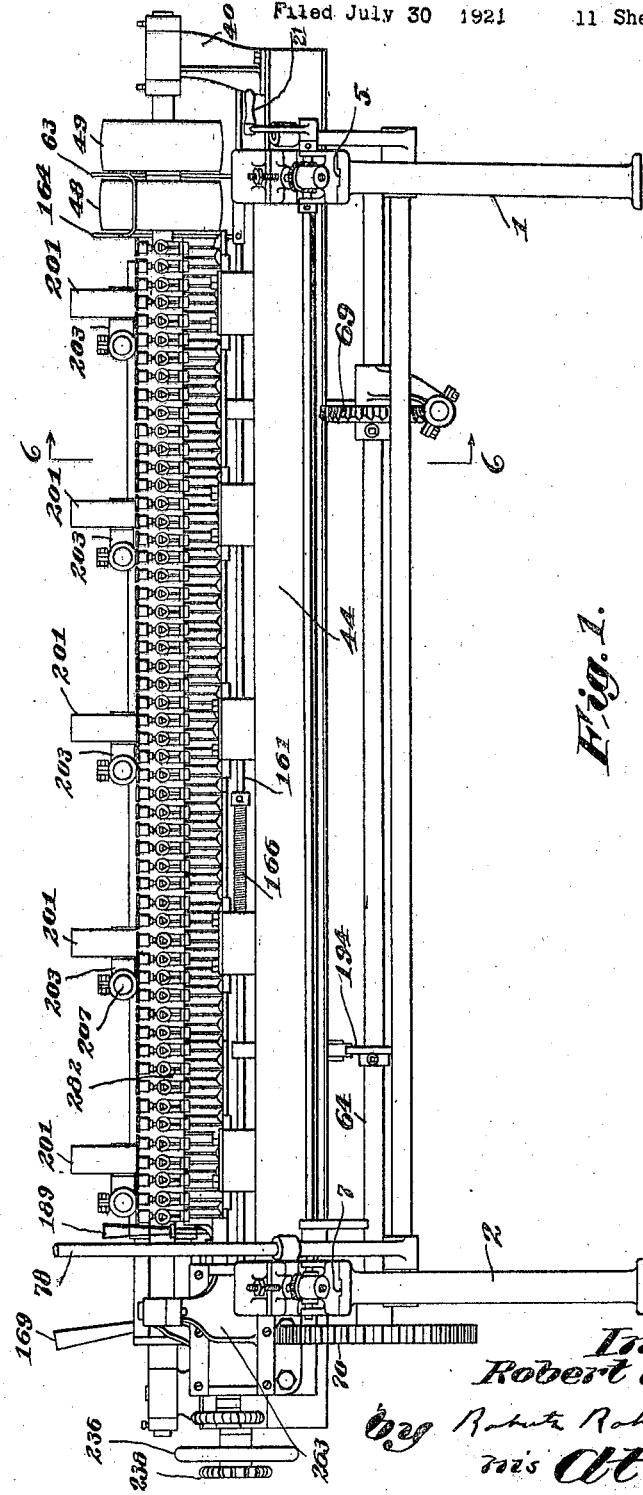
Fig. 1 is a front elevation of the machine, the gin saws and their supporting shaft being omitted.
Figure 5:
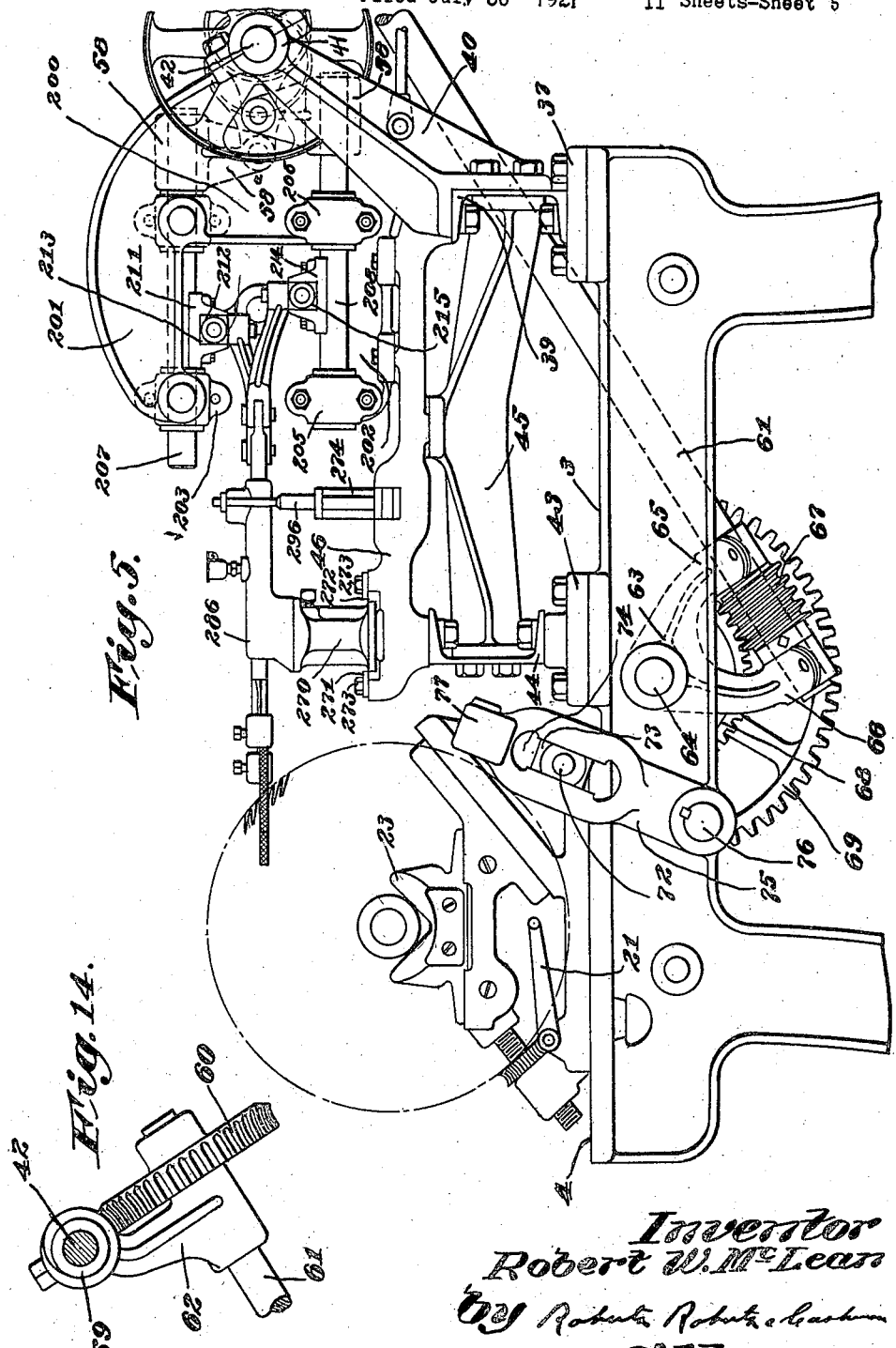
Fig. 5 is an end elevation, certain parts being broken away, showing the machine as viewed from the right hand side of Fig. 1.

Referring to the drawings, the numerals 1, 2 respectively indicate end frame members spaced apart a suitable distance and which serve to support the operative mechanism of the machine. These frame members are each provided with a substantially flat upper surface 3, (Fig. 5) upon which suitable supporting brackets hereinafter referred to may be bolted. The forward portions of the surfaces 3 are preferably machined off as indicated at 4 and are provided with longitudinal slots 5, (Figs. 1 and 16) such slots being dove-tailed if desired. Slidable upon each of the surfaces 4 is a support comprising a plate-like lower portion 6 having a guide fin 7 which engages within the corresponding slot 5. Extending upwardly and rearwardly from the part 6 is a member 8 which may be integral with the part 6 if desired or secured thereto in any desired manner. Preferably the part 8 is integral with the part 6 and is provided with a supporting web 9. The member 8 forms a guideway having a slot 10 with which a shoe 11 is slidably engaged. The shoe 11 is carried by a plate 12 and at that end of the plate opposite the shoe 11 there is secured a rod 13. The rod 13 extends in a direction substantially parallel to the surface of the guide member 8 and is externally screw threaded. The plate 6 is provided with an upstanding boss 15 having a bore 16 which serves as a guide for the rod 13, the latter being freely slidable within said bore. The member 6 is also provided with a boss 17 having a bearing for a shaft 18, such shaft extending transversely across the machine and being similarly journalled in the corresponding boss of the other support.

Upon the shaft 18 there are secured a pair of worms 19 which mesh with worm wheels 20 respectively. These worm wheels 20 are internally screw threaded for engagement with the external threads of the respective rods 13. At one end the shaft 18 is provided with a crank 21 (Fig. 1) whereby it may be rotated. By rotation of the crank 21 the worm wheels 20 are simultaneously rotated, thereby causing the rods 13 to move longitudinally of the bores 16 and thus causing the shoes 11 to slide along their guideways 10. By reason of the parallel arrangement of the stud 13 and the guideway 10, the supporting plate 12 is caused to move upwardly and rearwardly while maintaining its upper surface substantially horizontal.

Upon the upper surfaces of the respective members 12 are arranged the cradle devices 22, such cradle devices being provided with notches 23 for the reception of a gin saw shaft 24. Each cradle is also provided with forwardly and rearwardly directed flanges 25, 26, respectively, such flanges being slotted for the reception of securing means whereby the cradles may be detachably connected to the members 12. In accordance with the preferred arrangement, the members 12 are provided with slots 27, 28, within which a pair of eye bolts 29, 30, respectively, are journalled upon studs 31, 32. These eye bolts may be swung downwardly in the slots 26, 27, as indicated in dotted lines in Fig. 16 to permit the positioning of the cradle upon the member 12. The bolts may then be swung up into the slots in the flanges of the cradle and the nuts 33, 34 may then be tightened for holding the cradle firmly in position. Each shoe 11 is preferably provided with a slotted extension 35 which engages a locking bolt 36 extending into a threaded opening in the member 8. After adjustment of the supports 12, such supports may be retained in adjusted position by tightening the bolts 36.

Figure 3:
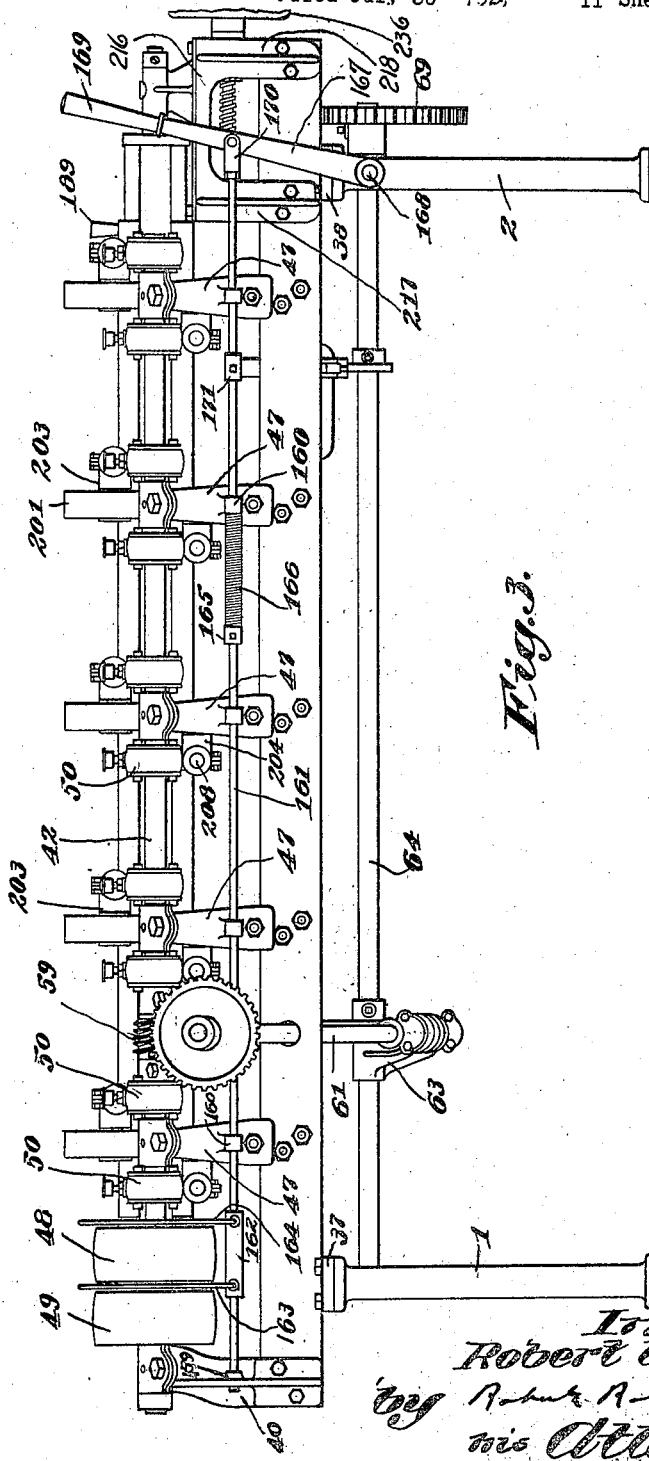
Fig. 3 is a rear elevation of the machine.

Upon the rear portions of the surfaces 3 of the frame members 1, 2, there are bolted plates 37, 38, (Fig. 3) and to these plates in turn is bolted a longitudinally extending channel bar 39 (Fig. 5) which extends from end to end of the machine. At one end of the machine, a bracket arm 40 is bolted to the rear side of the member 39, such bracket extending upwardly and rearwardly and providing journal bearings at 41 for the main drive shaft 42. At intermediate points upon the surfaces 3, there are also mounted blocks such as 43, upon which is supported the front channel bar 44 which extends from end to end of the machine. At intervals, transversely extending bridge members 45 are provided, such bridge members being bolted at their respective ends to the channel bars 39 and 44, respectively. Secured to the upper edges of the bars 39, 44, and resting upon the respective bridge members 45, are a plurality of supporting plates 46. To the rear edges of the respective plates 46, there are bolted rearwardly and upwardly extending brackets such as 47, (Figs. 3 and 6) said brackets providing additional bearings at their upper ends for the drive shaft 42 above referred to. Adjacent to its right hand extremity, as viewed in Fig. 1, the shaft 42 is provided with tight and loose pulleys 48, 49, respectively, and at intervals along said shaft are mounted eccentrics such as 50.

These eccentrics as indicated in Fig. 15 comprise the eccentric disks 51 keyed to the shaft 43 and encircled by eccentric straps 52. The eccentric straps are of the same thickness longitudinally of the shaft as the eccentric disks, and in order to maintain such eccentric straps in proper relation to the disks, an annular ring 53 is secured to the eccentric strap upon each side of the disk, being connected to the strap by means of screws 54 or in other desired manner. These rings overlap the edges of the disk and serve not only to retain the parts in proper relative position but also to avoid the spattering of oil from the eccentrics which is a common defect of eccentrics of ordinary construction. Each eccentric strap is provided with spaced ears 55, 56, having aligned openings therethrough for the reception of a stud 57, such stud being journalled in a bracket member 58 hereinafter more fully described.

At a convenient point upon the shaft 42 a worm 59 is secured, (Fig. 14) such worm meshing with a worm wheel 60 secured to the upper end of a forwardly and downwardly inclined shaft 61 journalled in a bracket 62 depending from the shaft 42. The lower end of the shaft 61 is journalled in a bracket 63 (Fig. 5) which is supported upon a shaft 64 extending longitudinally of the machine and journalled at its opposite ends in the frame members 1, 2, respectively. The bracket 63 is provided with spaced arms 65, 66, respectively, between which a worm 67 is fixed upon the shaft 61. The worm 67 meshes with a worm wheel 68 fast upon the shaft 64, the connections thus described serving to rotate the shaft 64 at a very slow rate of speed as compared with the speed of the drive shaft 42. Secured to the end of the shaft 64 at a point outside the frame member 2, is a gear wheel 69, such gear wheel being constructed and arranged to mesh with a gear wheel 70 (Fig. 4)) of substantially the same diameter and which may be secured to the end of a saw shaft such as 24, resting in the cradles 23. Rotation of the main drive shaft thus serves to turn the saw shaft slowly whereby to bring the saw teeth successively into the field of action of the filing mechanism hereinafter described.

Projecting outwardly from bosses such as 71 at the rear of the supporting members 6 are studs 72. Such studs may comprise the projecting ends of a shaft extending transversely across the machine and connecting the two supporting members 6 hereinbefore referred to, although this is not essential, as such studs may be formed as independent members if desired. Journalled upon each of the studs 72 (Fig. 5) is a block 73 which slidably engages a longitudinal slot 74 in a lever arm 75. The respective lever arms are secured to a shaft 76 which extends transversely across the machine frame, being journalled in suitable openings in the end members 1, 2, respectively. At their upper ends, the lever members 75 are provided with enlargements 77, having downwardly directed socket openings into which may be inserted the ends of bars such as 78, such bars serving as handles whereby the lever members 75 may be oscillated. While one of such bars 78 may be employed at each end of the machine, it is ordinarily sufficient to arrange such a bar at one end only thereof. By swinging the levers 75 the supporting members 6 are caused to travel along the surfaces 4 of the frame members, thus carrying the saw shaft cradles 23 forwardly or rearwardly of the frame. During such movement, the gear 70 is brought into or out of mesh with its driving gear 69. It is thus possible to mount a saw shaft in the cradles 23 while in their forward position, to apply the pinion 70 to such shaft, and thereupon to move the cradles with the saw shaft into operative position to be rotated by the gear 69.

*Stop mechanism.*

The bracket members 40 and 47 are provided with bosses such as 159, 160, respectively, provided with aligned openings in which is slidably arranged a shaft 161. Secured to the shaft at a point adjacent pulleys 48, 49 is a member 162 carrying a pair of belt-shifting fingers 163, 164, respectively, adapted to cooperate with the drive belt whereby the main shaft is driven. At a convenient point in the length of the rod 161 there is secured a collar 165 which serves as an abutment for one end of the coil spring 166 encircling the shaft and abutting at its opposite end against one of the bosses 160. This spring as thus arranged normally tends to shift the drive belt from the fast pulley 48 to the loose pulley 49, thereby stopping the machine.

Figure 4:
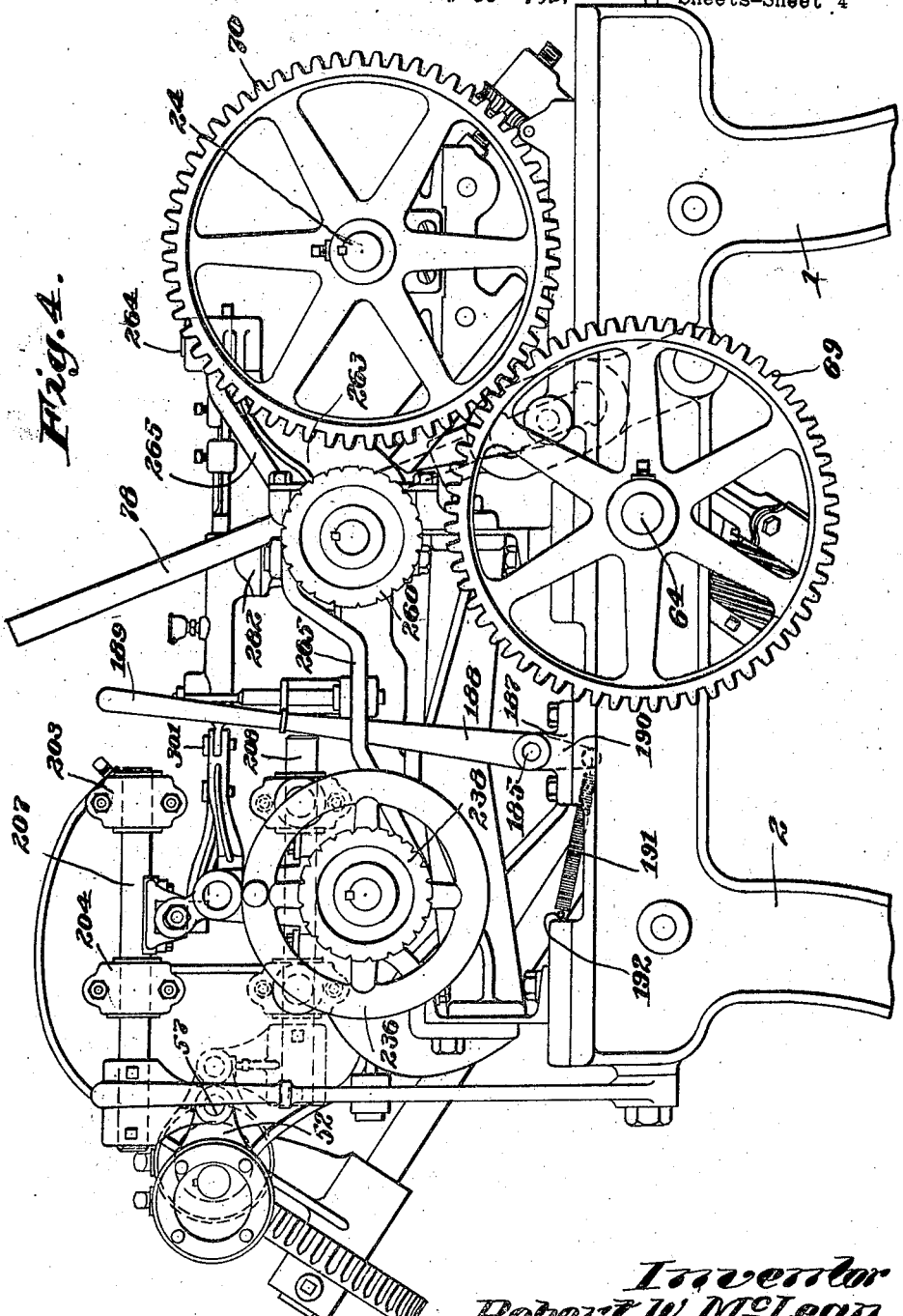
Fig. 4 is an end elevation, parts of the frame being broken away, as viewed from the left hand side of Fig. 1.

A lever 167 is pivoted at a convenient point as 168 upon the machine frame, such lever having a handle 169 whereby it may be oscillated. At a point intermediate the length of this lever, a link 170 is pivotally connected thereto, such link being secured to the end of the rod 161 whereby the lever 167 serves as a means for manually moving the rod 161 for shifting the drive belt onto the fast pulley in starting the machine. Secured to the rod 161 at the point 171 is a forwardly projecting arm 172, (Figs. 17, 18, 19) the forward end of such arm being guided by engagement with a longitudinal slot 173 formed in a plate 174 bolted to the rear side of the channel bar 44. The forward extremity of the member 172 is bifurcated to provide the spaced members 175, 176 (see Fig. 19) and between said members is arranged the latch 177, such latch being pivoted upon a pin 178. A leaf spring 179 is secured by means of a bolt 180 to the upper surface of the member 172 and at its free extremity bears upon the rear end of the latch member 177, thus normally tending to depress such latch member. The lower edge 181 of the slot 173 is provided near one extremity with a notch 182 with which the latch 177 may engage when permitted so to do. Projecting laterally from one side of the latch member 177 is a stud 183 which lies in the path of movement of a lever arm 184 fixedly mounted upon a shaft 185, such shaft having journals in brackets 186 depending from the adjacent bridge members 45. This shaft also has a bearing in a block 187 (Fig. 4) bolted upon the upper surface of the left hand frame member 2, and at a point adjacent such bearing a lever 188 is fixedly secured to such shaft, this lever extending upwardly and being provided with a handle 189 at its upper end. The lever 188 extends downwardly as indicated at 190 below the shaft 186 and a spring 191 is secured at one end of the depending portion 190 of this lever. The opposite end of the spring is secured at 192 to a suitable fixed part of the frame, such spring thus normally tending to swing the lever in a clockwise direction as seen in Fig. 4, whereby to carry the lever arm 184 out of engagement with the stud 183. The latch member 177 projects downwardly in front of the pivot 178 as indicated at 193 and secured to such depending extremity is a hardened wear plate 194. This wear plate cooperates with a stop cam 194ª fast upon shaft 64, such cam serving at each rotation of shaft 64 to engage plate 194 thereby lifting the rear end of latch 177.

File drive mechanism.

Each bracket 47 is provided with a vertical web 200 and projecting forwardly from said web are the upper and lower members 201, 202, respectively, such members being spaced apart in a vertical direction. Projecting laterally from the members 201, are the front and rear bosses 203, 204, while from the member 202, the front and rear bosses 205, 206, respectively (see Fig. 2) extend laterally in the opposite direction. These bosses provide guide openings for the reception of guide bars 207, 208, respectively. These bars are reciprocable in a front-to-rear direction in the guide openings and are provided at their rear extremities with the bracket members 58. The bracket members 58 which are secured to the upper guide bars have depending arms 58ª (Fig. 6) while the brackets 58 secured to the lower bars are provided with upwardly projecting arms 58ᵇ. These arms as above described, are provided with journal openings for the reception of the pins 57 whereby such bars are connected to corresponding eccentrics of the series of eccentrics 50 hereinbefore described.

In accordance with the present invention the eccentrics are so arranged that alternate eccentric disks are oppositely disposed on the shaft, that is to say, the throw of adjacent eccentrics is 180° apart. This arrangement provides for moving the upper guide rods 207 forwardly simultaneously with the rearward movement of the lower guide rods 208.

To each of the several guide bars of the upper series is secured a bracket 211 provided with a guide slot 212 in which a bar 213 is arranged for longitudinal sliding movement. The rods of the lower series are simultaneously provided with brackets 214 having slots for guiding a longitudinally slidable bar 215. Near the left-hand end of the mchine and at the rear thereof, a supporting plate 216 (Fig. 3) is connected to the channel plate 39 by means of depending bracket arms 217, 218, respectively. Upon the upper surface of the member 216 is mounted a slidable bracket 219, (Fig. 11) such bracket being guided for sliding movement relative to the member 216 by means of a suitable slot or in other desired manner. The member 219 is provided with a sleeve 220 in which is mounted a shaft 221 having a hub 223 fast upon its right-hand extremity. This hub is provided with a radial flange 224 having elongated slots 225, 226, through which extend the reduced extremities 227, 228, respectively, of the bars 213, 215. These bars are secured to the disk 224 by means of nuts 229, 230, which engage screw threads upon the extremities thereof. At its left-hand extremity, as viewed in Fig. 1, the shaft 221 is provided with a fixed collar 231, whereby the shaft is retained within the sleeve 221 and is constrained to move longitudinally therewith.

The member 216 is provided with a depending portion 232 having a journal opening at 233 in which is journalled a shaft 234. The hub 235 of a hand wheel 236 is splined upon the reduced extremity 237 of this shaft and may be forced into engagement with the end of members 232 by means of a nut member 238 which engages screw threads 239 upon such extremity whereby the wheel with the shaft 234 may be retained against rotation. Upon the opposite side of the bearing member 232, a collar 240 is secured to the shaft, whereby the latter is retained against longitudinal movement relative to its bearing. The shaft 234 is provided with a screw thread 241 of relatively coarse pitch which engages an internally screw threaded opening in a bracket 242 depending from the bracket 219, the bracket 242 being formed integrally with the part 219, or being secured thereto as desired. As herein illustrated, it is shown as a separate element attached to the part 219 by means of bolts 243.

The bracket 219 is preferably provided with two pointers 244, 245, Fig. 2, which cooperate with indexed plates 246, 247, respectively, arranged upon opposite sides of the bracket 219. These plates 246, 247 are secured to the member 216 by means of screws or bolts 248 and if desired may provide the guideway for the bracket 219. The graduations upon each of the plates 246, 247 are duplicated at two separated portions of such plates, such graduations serving to denote the angular relation of the files to the saw blades in a manner which will be noted hereinafter. Between such groups of graduations other indicia may be placed upon the two plates 246, 247 for cooperation with the pointers and serving to indicate the initial relation of the files and saw blades.

By reason of the arrangement of parts above described it is clear that the two bars 213, 215 are simultaneously but oppositely reciprocated toward and from the front of the machine, such bars moving bodily in a direction transverse of their lengths. By manipulation of the hand wheel 236 the bracket 219 is moved to the right or left and thus through the shaft 221 and its flange 224 the bars 214, 215 may be caused simultaneously to move to the right or left in the same direction without interfering with their front to rear reciprocation. It is thus possible, in accordance with the setting of the pointers 244, 245, to position the bars 213, 215 at desired points longitudinally of the machine frame while at the same time permitting them to be actuated by the eccentrics upon the main drive shaft 42.

Upon the left-hand portion of the channel bar 44 there is bolted a supporting plate or bracket 248 (see Figs. 12 and 13). This bracket is provided with a pair of rearwardly projecting ribs 249, 250, respectively, whose opposed faces serve as guiding means for a longitudinally slidable plate 251. A pair of plates 252, 253 are secured to the ribs 249, 250 by means of bolts 254, 255, respectively, such plates overlapping the rear surface of the plate 251 and serving to retain the same in proper position. The bracket 248 has an opening 256 at a point intermediate its length and between the ribs 249, 250. A boss 257 projects forwardly from the plate 251 and through the opening 256, such boss being provided with an internally screw threaded opening thus constituting a nut member. Adjacent its left-hand extremity the bracket 248 has a rearwardly propecting flange 258 having a central boss 259 provided with a journal opening in which is journalled a shaft having secured upon its outer end a hand wheel 260. A collar 261 is secured to the shaft in any desired manner at the right of the boss 259. This shaft is provided with screw threads 262 of relatively coarse pitch which engage the threaded opening in the boss 257. Projecting forwardly from the plate 257 is an arm 263 having secured therein a pivot pin 264. A lever 265 is pivoted at one extremity upon the pin 264, such lever extending downwardly and rearwardly and being fulcrumed at its rear end upon a stud 266 having threaded engagement with a boss 267 projecting downwardly from the bracket 242 previously described. The upper face of the bracket 248 may be provided with graduations as indicated at 268 (Fig. 2) with which graduation a pointer 269 carried by the plate 251 may cooperate.

File holders.

The members 46 adjacent their forward ends are provided with channels (Fig. 5) in which is slidably arranged a longitudinally extending bar 270, such bar being retained in position within the channels by means of overlapping plates 271, 272, secured to the member 46 by means of bolts 273. The members 46 are also provided at points to the rear of the bar 270 with additional slots in which is arranged to slide a longitudinally extending bar 274. At its left-hand extremity (Fig. 2) the bar 270 is connected to the lever 265 by means of a link member 275 and the bar 274 is similarly connected to the lever 265 by means of the link 276. If desired, one or both of such links 275, 276 may be of adjustable length, the link 276 herein being illustrated as provided with a turn-buckle 277 for varying its length. The links 275, 276 are connected to the lever 265 at separated points as indicated at 278, 279, respectively.

The bar 270 is preferably of substantially I-form, and is provided at its upper edge with a bearing surface 280. Extending downwardly into the member 270 from the surface 280 are a series of spaced sockets 281. Mounted upon the surface 280 are a series of brackets 282, such brackets having depending pins 283 seated respectively in the sockets 281. These pins are preferably provided with circumferential grooves 284 with which cooperate the ends 285 of set screws 286, such set screws passing through threaded openings in the member 270 and into the sockets 281, thereby serving to retain the pins 283 in operative position within the sockets while permitting their free rotation therein. The brackets 282 are each provided with a rearwardly extending guide member herein illustrated as an integral sleeve 286. Adjacent its rear extremity each sleeve has an upstanding boss 287 having a socket 288 therein in which is seated a pin 289. This pin may be retained in fixed position within its socket by means of a set screw 290. The pins 288 are provided with eccentric heads 291 preferably provided at their upper ends with slots 292 whereby they may be rotated in their sockets upon loosening of the set screws 290. Journalled upon the eccentric head 291 of each stud 288 is one end of a link 293, the opposite end of said link being pivoted upon a pin 294 having a head 295, such pin being fixed in or integral with a stud 296 upstanding from the bar 274. While as herein illustrated the pin 289 is provided with the eccentric head, it is obvious that the pin 294 instead, might be so provided, equivalent results being attainable in either case. The guide sleeves 286 are preferably provided with oil cups 297, and within each sleeve is arranged a slidable bar 298, such bar constituting a file holder. At its rear end, each bar 298 is flattened as indicated at 299 and provided with an opening 300 for the reception of a stud 301 (Fig. 6) whereby such bar is connected to the forward end of a link such as 302 or 303. The rear ends of the links 302, 303 are pivotally connected by means of pins 304, 305, respectively to the upper and lower bars 213, 215 previously described. In accordance with the present arrangements, alternate bars 298 are secured to the links 302 while the intermediate bars are secured to the link 303. It will thus be clear that alternate bars 298 will be caused to reciprocate in opposite directions upon rotation of the main drive shaft.

To the forward extremities of the bars 298, flat springs 306 are secured, such springs having collars 307 secured to their forward extremities. These collars are provided with triangular bores into which may be fitted the ends of triangular files 308 secured in position in such collars by means of set screws 309. The file holders comprising the bars 298 with their spring supported collars 307 are arranged in closely spaced relation in such manner as to permit alternate saw blades, such as 310, to be engaged simultaneously by the files 308 carried by such holders.

In Figs. 20 to 24, the saws are indicated as comprising two series 310, 310ª, the saws of the two series alternating with each other, those of the series 310ª being indicated in dotted lines for convenience of illustration.

In the operation of the machine as above described, the operator by manipulating the lever 78, will cause the saw shaft cradles 23 to move forwardly away from the bank of files. A saw shaft having a series of saws secured thereon is then placed in the cradles 23 and the gear wheel 70 is secured upon the end of the shaft. The handle 78 is then pushed to the rear, carrying the cradles with the saw shaft backwardly until the gear 70 is brought into mesh with the gear 69. The operator by means of the handle 169 now shifts the belt from the pulley 49 to the pulley 48, at the same time compressing the spring 166 and causing the latch 177 carried by the arm 172 to drop into engagement with the notch 182 in the bracket member 174. With the parts in this position, the main shaft is rotated, thereby causing the eccentrics to reciprocate the file holders with their files, alternate files moving oppositely. In placing the saw shaft in position and in starting the machine, it is assumed that the pointers 244 and 269 occupy the positions indicated in Fig. 22, that is to say, each pointer is opposite the figure 1 of the index graduations. In this position the lever 265 is so arranged that the slide bars 270, 274 occupy an intermediate position whereby the several file holders are held substantially perpendicular to the axis of the saw shaft. The saws may thus freely pass between the files without contact therewith. After placing the saw shaft in position and either before or after starting the machine, the hand wheel 236 is so manipulated as to carry the pointer 244, for example, to the left of the central graduation upon the plate 246. As this pointer is moved, it is evident that the lever 265 will be swung about its vertical pivot 264. Such movement serves to slide the bars 270, 274 to the left, carrying therewith the studs 283 upon which the sleeves 286 are pivoted and likewise carrying the pins 294 to which the rear ends of the respective sleeves 286 are connected. At the same time the movement of the pointer member 244 is accompanied by a movement of the bars 213, 215 to the left, the points of connection of the various bars 270, 274, 213, 215 to the lever 265 being such as to maintain the sleeves 286 and their actuating links 302, 303 in substantial alignment during such movement. When in their new position, the file holders with their files will thus be actuated in substantially the same manner as when occupying a position at right angles to the axis of the saw shaft. It may be noted by inspection of Figs. 20 to 24 that the fulcrum 264 of the lever 265 is substantially in alignment with the extremities of the files and thus the swinging of the file holders with their files takes place about points adjacent the extremities of the files, that is to say, about imaginary axes which lie beyond the ends of the respective file holders and between the planes of adjacent saw blades. When the index member 244 has been properly set in accordance with the desired degree of angularity of the file cut, the files engage the saw blades with which they cooperate and serve to sharpen the teeth thereof. As the saw blades are slowly rotated by means of the gear connections including the gears 68, 70, the files gradually snap from one tooth to another until the shaft has made a full revolution, the resiliency of the file supporting springs permitting such action to take place without the necessity of stopping the machine in the interval between each tooth.

When the saw shaft has made a complete revolution, the shaft 64 which turns in consonance therewith, will also have made a complete revolution, whereupon the cam 194ª carried by such shaft is brought into engagement with the wear plate 194, thereby lifting the latch 177 out of notch 182 and permitting the spring 166 to shift the rod 161 to the right, thereby carrying the belt into engagement with the loose pulley and bringing the machine to rest. Thus in one revolution, the teeth of alternate saws have been filed upon one side. The operator now manipulates the hand wheel 236 to carry the pointer 244 to the right-hand side of the central graduation of plate 246, bringing it to a point in the opposite series of graduations corresponding to that at which it stood in the previous operation. The machine is again started and permitted to operate until the saw shaft has made a second full revolution. In the setting of the pointer 244 to the right, as indicated in Fig. 21, the several files are swung out of engagement with the saws of the series 310 and brought into engagement with saws of the series 310ª, making angles therewith equal but opposite to the angles which they made with the saws of the first series. Thus during the second rotation of the saw shaft, the saws of the series 310ª are filed on their left-hand sides. When the machine has stopped at the end of the second rotation of the saw shaft, the index 244 is brought back to the central graduation of the plate 246, bringing the file holders to their original position as shown in Fig. 22. The operator then draws the saw shaft forwardly by means of the handle 78 and permits it to remain in its forward position while he manipulates the hand wheel 260 for shifting the pointer 269 from the left-hand graduation upon the bracket 248 to the right-hand graduation thereof. Such movement shifts the fulcrum pin 264 bodily to the right. The operator then manipulates the hand wheel 236 to carry the pointer 245 to the central graduation of the plate 247, thus carrying the pivot pin 266 at the rear end of the lever 265 to the right. The lever 265 is thus shifted bodily to the right, carrying therewith the bars 270, 274, 213, and 215 which serves to shift the entire series of file holders with their actuating links to the right, a distance such as to bring them opposite the spaces between the next pair of saw blades to the right of their former position. The operator then returns the saw shaft to working position by means of the handle 78 and adjusts the hand wheel 236 to carry the pointer 245 opposite the proper graduation at the left of the plate 247 (Fig. 21). This swings the files into contact with the right-hand faces of the saws of the series 310ª and upon starting the machine, the teeth of such saw blades are filed, completing the operation thereon. At the end of this third rotation of the saw shaft, the machine is stopped automatically and the hand wheel 236 is manipulated to carry the pointer 245 to a position opposite the proper graduation of the right-hand group upon plate 247 as indicated in Fig. 22. This swings the files into engagement with the left-hand faces of the saw blades of the series 310 and upon starting the machine, the files serve to complete the filing of the teeth of these saws. After this fourth revolution of the saw shaft, the machine again stops, the hand wheel 236 is actuated to bring the file holders back into the neutral position with their axes perpendicular to the axis of the saw shaft and the saw shaft is then drawn forwardly and removed from the cradles, the gear 70 being removed for application to a new shaft carrying saws to be sharpened.

If for any reason it be desired to adjust an individual file holder relatively to the other file holders, such adjustment may be accomplished by loosening the set screw 290 and turning the stud 288 by means of a screw driver inserted in the slot 292. Such turning of the stud, by reason of the eccentricity of the head 291, serves to change the effective length of the link 293, thereby swinging the file holder guide member 286 about its stud 283.

As the horizontal plane of actuation of the files is constant as respects the machine frame, it becomes necessary to adjust the position of the saw shaft relatively to such plane by reason of the fact that the saw blades are not of uniform diameter, being gradually decreased in diameter by wear. For the purpose of bringing the saw shaft with its saws into proper relative position as respects the files, the adjustable support for the saw shaft cradles disclosed in detail in Fig. 16 has been provided. By manipulation of the crank 21 it is possible to move the saw shaft cradles upwardly and rearwardly whereby to bring the saws, regardless of their diameters, into proper position for cooperation with the files.

During the operation of the machine if for any reason it be desired to bring it to rest without waiting for the automatic stopping of the same, it is merely necessary to draw the handle 189 rearwardly, thereby rocking the lever arm 184 into contact with the pin 183, thus lifting the latch 177 from its retaining notch and permitting the spring 166 to shift the belt on to the loose pulley.

While the operation of the machine has herein been described as following a definite and specific sequence it is evident that modifications in such sequence may be made as circumstances may require, and while the arrangement hereinabove described and illustrated is regarded as a preferred means for carrying the invention into effect, it is contemplated that various changes and rearrangements of parts as well as modifications of the elements comprising the same might well be made without in any manner departing from the spirit of the present invention.

Having thus described the invention in a preferred form of the same together with the mode of operation thereof, what I claim and desire to secure by Letters Patent of the United States is:

1. That mode of filing gin saws arranged in series upon a shaft which comprises simultaneously filing all the teeth of alternate saws upon one side, and then filing all the teeth of intervening saws upon the opposite side.

2. That mode of filing saws arranged in series upon a shaft which comprises filing one side of each tooth of alternate saws of the series, the teeth of all of said saws being filed upon the same side, and thereafter filing each tooth of the intermediate saws.

3. That mode of filing saws arranged in series which comprises filing one side of all the teeth of alternate saws, filing all of the teeth of the intermediate saws upon one side, thereafter filing all of the teeth of said latter saws upon the other side, and then completing the filing of the teeth of the first saws.

4. That mode of filing saws arranged in series which comprises introducing files into alternate spaces between the saws, filing the saws upon either side of said spaces successively and thereafter shifting said files into the intermediate spaces.

5. That mode of filing saws arranged in series which comprises introducing files into the alternate spaces between the saws, simultaneously setting said files at an angle to sharpen the teeth of saws defining one side of said spaces, thereafter simultaneously swinging said files into angular position to sharpen teeth of the saws defining the opposite sides of the respective spaces, thereafter removing the files from said spaces, introducing them into the next adjacent spaces and repeating the preceding operation.

6. A saw filing machine comprising means to support a series of parallelly arranged saws, and means for simultaneously filing all of the teeth of alternate saws upon one and the same side and for thereafter filing all of the teeth of intervening saws of the series.

7. A machine for filing gin saws mounted in series upon a shaft comprising a series of substantially parallel reciprocating files, and means for actuating said files whereby simultaneously to file alternate saws of the series.

8. A machine for filing gin saws mounted in series upon a shaft comprising means for supporting a shaft with its saws, a series of files projecting into alternate spaces between the saws, and means for so actuating said files as to file alternate saws of the series.

9. A saw filing machine comprising means for supporting a gin saw shaft having a series of saws thereon, means whereby said shaft may be rotated, means simultaneously operative for filing one side only of the teeth of all the alternate saws of the series during a complete rotation of said shaft and means whereby at the end of such rotation said filing means may be arranged to file the other sides of said teeth during a succeeding rotation of the shaft.

10. A saw filing machine comprising filing means, a horizontally movable support provided with an inclined track, a saw shaft cradle mounted upon said support, and means for moving the cradle along the inclined track whereby simultaneously to adjust said cradle both horizontally and vertically relatively to the filing means.

11. A saw filing machine having a series of similarly disposed reciprocable files, a bodily slidable support for a saw shaft, means guiding said support to move in a substantially horizontal plane, and manually operable means connected to the support for moving it whereby to carry a saw shaft mounted thereon toward and from operative position relatively to the files.

12. A saw filing machine having a plurality of similarly disposed reciprocable files, slidable means for supporting a gin saw cylinder in position for operative engagement of its saws by said files, and a lever member having connection with said slidable means whereby to permit moving the latter to carry said saws away from the files.

13. A saw filing machine having spaced guide surfaces, saw supporting brackets slidably engaging said surfaces, a shaft extending transversely between said surfaces, slotted arms secured to said shaft, studs carried by the respective brackets and engaging the slots of said arms and manually operable means for turning said shaft.

14. A saw filing machine comprising end frame members, said frame members having horizontally arranged guide surfaces respectively, a saw supporting bracket slidably engaging each of said guide surfaces, a shaft extending transversely of the machine and journalled in the respective frame members, arms secured to said shaft, said arms having longitudinal slots therein, and a stud projecting from each of the brackets and engaging the respective slots, one at least of said arms having a socket opening for the reception of an actuating handle.

15. A saw filing machine comprising a support having an inclined guideway, a slide member engaging said guideway, a saw shaft cradle mounted upon said slide member, and means for moving said slide member along said guideway.

16. A saw filing machine comprising a member having an upwardly inclined guideway, a slide having an element engaging said guideway, a saw shaft cradle mounted upon said slide, screw threaded means for moving said slide along its guideway, and means for retaining said slide in adjusted position.

17. A machine of the class described comprising an upward inclined guideway, a horizontally disposed plate having a shoe at one end engaging said guideway, a rod projecting from the opposite end of the plate and extending in a direction substantially parallel to said guideway, and means whereby said rod may be moved to position said shoe relatively to its guideway.

18. A saw filing machine having an inclined guideway, a plate having a shoe adjacent one end for engaging said guideway, a rod projecting from the opposite end of said plate, said rod being externally screw threaded, an abutment having a guide opening for the passage of said rod, and a rotatable nut member engaging said rod and bearing against said abutment.

19. A saw filing machine comprising a support having parallelly disposed guide elements, a plate having spaced members cooperable with the respective guide elements, one of said members being provided with screw threads, and a rotatable nut member engaging said threads and constructed and arranged, upon rotation, to move said threaded member relatively to its guiding element.

20. A machine of the class described comprising a support having an upwardly inclined guideway, a boss spaced from said guideway and having an opening whose axis is substantially parallel to said guideway, a plate having a shoe engaging said guideway, and an externally threaded rod passing through said opening, an internally screw threaded wheel engaging said rod and bearing against said boss, and means for rotating said wheel.

21. A saw filing machine comprising a pair of spaced supports having parallel, upwardly inclined guideways, saw shaft cradle supporting members engageable with the guideways of the respective supports, a rotatable shaft extending from one of said supports to the other, and means interposed between said shaft and the respective supports whereby rotation of the shaft serves simultaneously to adjust said members along their guideways.

22. A saw filing machine comprising spaced frame members, inclined guide means carried by each of said frame members, a saw shaft cradle supported for adjustment relatively to said guide means, a shaft journalled in the respective frame members, worms fixed to said shaft adjacent each of said frame members, worm wheels actuable by the respective worms, and means operable by rotation of said worm wheels for simultaneously adjusting said cradles.

23. A machine of the class described comprising an adjustable support, means for moving said support diagonally upward, a saw shaft cradle mounted upon said support, said cradle having slotted flanges at its opposite sides, and members secured to the support and engageable with the slots in said flanges for disengageably retaining the cradle in fixed relation to the support.

24. A machine of the class described comprising an adjustable supporting plate, a saw shaft cradle mounted thereon, said cradle having oppositely directed flange members, and a pair of locking elements pivotally secured to the plate and engageable with the respective flanges.

25. A machine of the class described comprising a support, a saw shaft cradle mounted thereon, slotted flanges extending from opposite sides of said cradle, eye-bolts pivoted to said support, the threaded ends of said bolts being engageable with the slots in the respective flanges, and nuts engaging the respective bolts and constructed and arranged to bear against said flanges.

26. A machine for filing gin saws comprising a series of substantially parallel, reciprocable file holders, and means for simultaneously imparting operative movement to alternate holders of the series in opposite directions.

27. A machine of the class described comprising a series of substantially parallel, reciprocable file holders, independent means for connecting alternate holders of the series, a rotatable shaft, and devices carried by said shaft for simultaneously moving said means in opposite directions.

28. A saw filing machine comprising a series of substantially parallel reciprocable file holders, slidable bars having connection respectively with alternate holders of the series, a rotatable shaft, and eccentric means carried by said shaft for simultaneously moving said bars in opposite directions.

29. A saw filing machine having a series of file holders, means connecting certain of said file holders for simultaneous operation, a rotatable drive shaft having an eccentric disc fast thereto, an eccentric strap cooperating with said disc, link means interposed between said strap and said holder connecting means, and an annular ring secured to said strap at either side of the disc and overlapping the respective side faces of the latter.

30. A saw filing machine comprising a horizontally disposed bank of reciprocable file holders, a pair of spaced bars extending transversely of said holders and above and below the plane thereof, respectively, means for supporting said bars for bodily sliding movement in a direction transverse of their lengths, means connecting alternate holders of the series to the respective bars, a rotary drive shaft, and eccentric means thereon for moving said bars simultaneously in opposite directions.

31. A machine of the class described comprising a horizontally disposed series of file holders extending transversely across the front of the machine, guide means at the rear portion of the machine disposed in planes above and below the holders, respectively, rods slidable in the respective guide means toward and from the front of the machine, bars supported by the upper and lower rods, respectively, means connecting alternate holders with the respective bars, and means for reciprocating the upper and lower bars in opposite directions.

32. A saw filing machine comprising a horizontally disposed series of file holders, frame members having guide openings arranged above and below the plane of said file holders, guide rods slidable in the respective openings, transverse bars secured to the respective rods, link connections uniting alternate holders of the series with the respective bars, brackets secured to said bars, a shaft having eccentrics thereon, and means connecting each of said brackets to one of said eccentrics.

33. A saw filing machine having an elongated frame, a drive shaft extending lengthwise thereof and at its rear portion, a plurality of pairs of spaced guide openings in said frame, rods reciprocable in said openings, longitudinally extending horizontal bars secured to the rods engaging the pairs of guide openings, respectively, a series of tool holders, connections between alternate holders and the respective bars, a drive shaft, and means carried by said shaft for reciprocating the upper and lower rods in opposite directions.

34. A machine for filing gin saws mounted in series upon a shaft comprising a series of reciprocating files, a shaft for driving the same, connections between the latter shaft and the saw shaft whereby slowly to rotate the latter, a cam device rotatable in consonance with said saw shaft, and means actuable by said cam upon completion of a single rotation thereof for bringing said drive shaft to rest.

35. A saw filing machine comprising a support for a saw shaft having a series of saws thereon, a drive shaft, connections between said shafts, including a worm and wheel for slowly rotating said saw shaft, disengageable driving connections, latch means for retaining said connections in position of operative engagement, and a cam rotatable in consonance with said shaft and operable to actuate said latch means whereby to permit disengaging said driving connections to stop the machine.

36. A saw filing machine comprising a drive shaft having tight and loose pulleys, a belt shifter, spring means normally tending to shift the drive belt onto the loose pulley, latch means for holding said belt shifter in driving position, a saw shaft driven by said drive shaft, a cam rotatable in consonance with the saw shaft and operable to release said latch means upon completion of each rotation of the saw shaft, and manually operable means for releasing said latch.

37. A saw filing machine having a drive shaft, means mounted thereon for actuating a file holder, a saw shaft having a gear fast thereon, an intermediate shaft having a gear engaging said first gear, a worm-wheel fast on said intermediate shaft, a worm carried by said drive shaft, and a transmission shaft having a worm-wheel meshing with said worm, and a worm engaging the worm-wheel on the intermediate shaft.

38. A saw filing machine having a file holder actuating shaft, a rotatable saw shaft, a lever member for controlling the operation of said first named shaft, spring means tending to move said lever, a spring controlled latch carried by said lever and engageable with a fixed part of the machine, a shaft having a hand lever fixed thereon, an arm projecting from the shaft, and a pin carried by the latch and lying in the path of movement of said arm, the engagement of said pin by said arm serving to release said latch whereby to permit movement of said lever by its spring.

39. A machine for filing gin saws comprising means for supporting a series of saws in parallel, spaced relation, a series of files for simultaneously filing alternate saws of the series, means for simultaneously varying the operative angles of each of said files with the plane of its corresponding saw blade, and index means for determining such angle.

40. A saw filing machine comprising means for supporting a series of spaced and parallel circular saw blades, a series of files, means for simultaneously imparting movement of reciprocation to the several files in normally fixed parallel paths intersecting the planes of alternate saw blades, and means for simultaneously adjusting the angular relation of said paths to said planes.

41. A machine of the class described having a series of angularly adjustable file holders, and means for simultaneously adjusting said file holders, said means comprising a lever, a slidable bracket member, guide means for said bracket member, said member having an internally screw threaded opening therein, a screw threaded shaft engaging said opening, and a hand wheel fast to said shaft whereby to rotate the same.

42. A machine of the class described having a pair of parallelly arranged slide bars, a pivoted lever arm, link connections between the respective bars and said arm, a hand wheel, means actuated thereby for adjustably positioning said arm and thereby imparting movement to said slide bars, a file holder guide swively supported upon one of said bars, and link means connecting the other of said bars to the file holder guide.

43. A machine of the class described having an angularly adjustable file holder and means for adjusting said file holder comprising a lever, a slidable bracket pivotally connected to the free extremity of the lever, a nut member carried by said bracket, and a manually actuable screw engaging said nut for adjustably positioning the bracket.

44. A machine of the class described comprising a series of reciprocable file holders, guide means for each of said holders, a slidable bar extending transversely of said series, pivotal means for supporting said guide means upon said bar, a second slidable bar arranged parallel to said first bar, connections between the several guide means and said second bar, a pivoted lever arm, pivotal connections between the respective bars and said arm, and means for manually adjusting said arm about its pivot.

45. A saw filing machine comprising a file holder, a file having one end secured therein, means for supporting and guiding said file holder, and means for swinging said supporting and guiding means about an axis adjacent the free extremity of the file.

46. A saw filing machine comprising a reciprocable file holder, a guide sleeve therefor, a slidable supporting member, pivot means for connecting the sleeve thereto, a second slide member connected to said sleeve at a distance from said pivot means, and an angularly adjustable lever arm having said slide members pivotally secured thereto at different distances from its axis.

47. A saw filing machine comprising a file holder, a guide sleeve therefor, a bodily movable support having pivotal connection with the sleeve, a second bodily movable member also having pivotal connection with said sleeve, and means for simultaneously imparting movement to said support and member at different speeds whereby to swing said sleeve about an axis beyond its extremity.

48. A saw filing machine comprising a file holder, a file having one of its ends secured therein, a guide for the file holder, a support having pivotal connection with said guide, and means for simultaneously moving said support and swinging said guide about its pivotal axis whereby to orient said file holder about a point substantially coincident with the free extremity of the file.

49. A saw filing machine comprising means to support a pair of saws in parallel and spaced relation, a file for filing said saws, and means for supporting said file for angular adjustment about a point intermediate said saws whereby to permit it to be brought into contact with either of said saws at will.

50. A saw filing machine comprising means for supporting a pair of saw blades in parallel spaced relation, a file for sharpening said saw blades, and means for supporting said file with its extremity in the space between said blades, said means being constructed and arranged to swing about an axis adjacent said extremity of the file and extending substantially parallel to the planes of the saw blades.

51. A saw filing machine comprising means for supporting a gin saw shaft having a series of saws thereon, a series of normally parallel file holders, a file in each holder, successive files engaging alternate saws respectively of the series, and means for moving one of the said file holders out of parallelism with the others at will for individually adjusting its file to the corresponding saw blade.

52. A saw filing machine comprising means for supporting a gin saw shaft having a series of saws thereon, a series of normally parallel file holders, files in the respective holders, and means permitting the individual orientation of any of said file holders about the axis of its supporting means at will.

53. A saw filing machine having a series of normally parallel file holders each pivoted to turn about an individual axis, means for simultaneously and similarly orienting all of said file holders about their respective axes and means permitting independent orientation of any of said holders about its individual axis.

54. A saw filing machine comprising means for supporting a gin saw shaft having a series of gin saws thereon, a series of files, successive files of the series engaging alternate saws upon the saw shaft, means for reciprocating said files in normally fixed parallel paths intersecting the planes of corresponding saw blades at substantially like angles, means for simultaneously adjusting the angles of such intersection of the several files, and independent means for adjusting the angle of intersection of each individual file with respect to its corresponding saw.

55. A saw filing machine comprising a series of substantially parallel guide sleeves, file holders reciprocable therein, swivel means for supporting each of said guide sleeves adjacent one end thereof, and means for simultaneously swinging said sleeves through equal angles.

56. A saw filing machine having a transversely extending supporting member, a series of guide sleeves pivotally mounted upon said member, a file holder reciprocable in each of said sleeves, and means engaging said sleeves at points removed from their pivotal axes whereby to angularly adjust said sleeves and file holders.

57. A saw filing machine having a transversely extending supporting member provided with spaced sockets, guide sleeves having depending pintle pins engaging the respective sockets, file holders carried by the guide sleeves, and an adjusting bar having connection to each of said sleeves at a point substantially removed from the pivotal axis thereof.

58. A saw filing machine comprising a pivotally supported guide member, a file holder guided thereby, a slide member arranged in a plane below that of said guide member and movable transversely of the axis of the latter, a pin upstanding from said slide member, and a link having one end pivoted upon said pin and having its opposite end pivotally connected to said guide member.

59. A saw filing machine having an elongated guide member pivotally mounted adjacent one of its ends to swing in a horizontal plane, a member movable in a path intersecting the axis of said guide member, and connections including an adjustable eccentric stud between said free end of the guide member and said movable member.

60. A saw filing machine comprising a support having a socket therein, a guide sleeve having a pintle pin projecting at right angles to the axis thereof, said pin being provided with a circumferential groove and being seated in said socket, and a set screw engaging a threaded opening in said support and having its inner end projecting into said groove.

61. A machine of the class described comprising a series of pivotally supported guide members, file holders guided thereby, a slide bar movable in a path transverse of said guide members, a series of pins upstanding from said slide bar, and means for connecting each pin to one of said guide members at a point removed from the pivotal axis thereof.

62. A machine of the class described having a guide sleeve pivoted to swing in a horizontal plane, a tool holder reciprocable in said sleeve, a boss projecting from said sleeve and having a socket therein, a stud rotatable in said socket and having an eccentric head, a link pivotally engaging said head, means connected to said link and movable in a predetermined path, and means whereby said stud may be turned in its socket and fixedly secured in adjusted position.

63. A machine of the class described having a series of normally parallel guide sleeves pivoted to swing about individual pivots and in a horizontal plane, a slide bar underlying said guide sleeves and extending transversely across the series thereof, a pin projecting upwardly from said bar at one side of each of said sleeves, a link pivotally connected to each pin, and an adjustable eccentric pivot carried by each sleeve and engaging an opening in a corresponding one of said links.

64. A saw filing machine having an angularly adjustable and reciprocable file holder, means for adjusting said file holder about an axis beyond its end, and means for bodily moving said file holder whereby to shift the position of its axis of angular adjustment.

65. A saw filing machine having a series of substantially parallel independently movable file holders, means for simultaneously reciprocating said file holders, and means for shifting said file holders simultaneously and bodily in a direction transverse of their respective paths of reciprocation.

66. A saw filing machine having a series of substantially parallel independent file holders, means for simultaneously shifting the holders of said series in a direction transverse of their length, and means for simultaneously swinging each of said file holders in an arcuate path.

67. A machine for filing gin saws mounted in parallel spaced relation upon a shaft, having a support for a saw shaft, a series of files for simultaneously filing alternate saws of the series, means for simultaneously orienting said files whereby to determine a common operative angle of engagement of said files with their respective saws, and means for imparting simultaneous bodily movement to the files whereby to bring them into position for engagement with other saws of the series.

68. A machine of the class described having a series of angularly adjustable tool holders, means comprising a pivoted lever arm for simultaneously adjusting said tool holders, means for actuating said lever, and a manually shiftable pivot for said lever.

69. A filing machine having an angularly adjustable file holder, a pivoted lever arm having operative connection with said file holder, a slidable bracket to which said lever arm is pivoted, and manually operable means for adjusting said bracket.

70. A filing machine having an angularly adjustable file holder, a slidable bracket member, a lever fulcrumed upon said bracket, connections between said lever and file holder, a screw threaded shaft engaging a threaded opening in said bracket member, and a hand wheel fast to the shaft for rotating the same.

71. A machine of the class described comprising an angularly adjustable guide member, a file holder slidably supported thereby, a reciprocable member, a link connecting said member with said file holder whereby to reciprocate the same, and means for simultaneously swinging said guide member and imparting bodily movement to said reciprocable member in a direction transverse of its reciprocating movement whereby to maintain said link substantially in alignment with said guide member in all positions of the latter.

72. A machine of the class described comprising a frame having aligned guide openings, a rod slidable within said openings, a bracket fast to said rod and having a guide slot therein, a bar slidable in said slot and in a direction transverse of the length of the rod, means for reciprocating the rod, a reciprocable and angularly adjustable tool holder, a link connecting said tool holder and bar, and means for adjustably positioning said bar is said slot.

73. In a machine of the class described, supporting means, four substantially parallel and longitudinally slidable bars carried thereby, means for simultaneously adjusting said bars longitudinally, means for reciprocating one pair of said bars in opposite directions and transversely of their lengths, a series of tool holder guides pivotally connected to the other pair of bars, tool holders reciprocably supported in said guides, and link connections between alternate tool holders of the series and the respective bars of said first pair.

74. A saw filing machine having a reciprocable file holder, a guide sleeve therefor, supporting means having pivotal connection with said guide sleeve at two separate points in its length, a lever fulcrumed at one end and having connection with the respective supporting means at spaced points in its length, means for reciprocating said file holder, said last-named means being connected with said lever adjacent the free extremity thereof, means for swinging said lever about its fulcrum, and manually adjustable means for shifting the position of said fulcrum.

75. A saw filing machine comprising a series of angularly adjustable independent file holders, a bodily reciprocable bar having connection with each of the file holders for operatively actuating the same, a lever arm, connections between said lever arm and the several file holders whereby movement of said lever arm serves angularly to adjust said holders, and means for simultaneously swinging said arm and moving said bar in a longitudinal direction.

76. A saw filing machine having a series of reciprocable file holders, angularly adjustable guide members therefor, a pair of longitudinally slidable bars, power means for imparting bodily movement to said bars in opposite directions and transversely of their lengths, link connections between alternate file holders and the respective bars, and normally operable means for simultaneously moving said bars in a longitudinal direction and for angularly and similarly adjusting all the guide members of the series.

77. A saw filing machine comprising means for supporting a saw cylinder being a series of saws thereof, a series of independent, substantially parallel reciprocable file holders, files in said holders, said files all being substantially parallel and pointing in the same direction, a pair of elongate bars extending longitudinally of the series of holders, means guiding the bars to slide transversely of their lengths, means connecting a group of said file holders with each bar, a rotary shaft, and eccentric means carried by said shaft for simultaneously moving the bars in opposite directions.

Signed by me at Boston, county of Suffolk, Massachusetts, this 29th day of July, 1921.

ROBERT W. McLEAN.